United States Patent [19]

Weyer

[11] Patent Number: 4,590,816
[45] Date of Patent: May 27, 1986

[54] BALL SCREW ACTUATOR

[76] Inventor: Paul P. Weyer, 48811 128th Ave. Southeast, Enumclaw, Wash. 98022

[21] Appl. No.: 575,228

[22] Filed: Jan. 30, 1984

[51] Int. Cl.$^4$ .......................... F16H 1/18; F16H 1/20; F01B 3/00
[52] U.S. Cl. ................................. 74/424.8 NA; 92/33; 92/31; 74/89.15; 74/424.8 R
[58] Field of Search ............... 74/424.8 NA, 424.8 B, 74/424.8 R, 89.15, 110, 458, 459, 457; 92/33, 31, 32

[56] References Cited

U.S. PATENT DOCUMENTS

| | | | |
|---|---|---|---|
| 2,266,923 | 12/1941 | Trbojevich | 74/498 |
| 2,768,532 | 10/1956 | Russell | 74/424.8 R |
| 2,773,485 | 12/1956 | Geyer | 92/33 |
| 2,804,054 | 8/1957 | Geyer | 92/33 |
| 2,806,450 | 9/1957 | Geyer | 121/38 |
| 2,844,969 | 7/1958 | Lohr | 74/424.8 R |
| 2,898,888 | 8/1959 | Geyer | 74/424.8 R |
| 2,918,786 | 12/1959 | Geyer | 74/424.8 R |
| 2,969,689 | 1/1961 | Martens | 74/424.8 R |
| 3,062,070 | 11/1962 | Beatty | 74/459 |
| 3,255,806 | 6/1966 | Meyer et al. | 92/33 |
| 3,302,477 | 2/1967 | Grabowski | 74/424.8 NA |
| 3,323,382 | 6/1967 | Ruschmann | 74/424.8 R |
| 3,636,780 | 1/1972 | Wallace | 74/89.15 |
| 3,762,227 | 10/1973 | Bohnhoff | 74/89.15 |
| 3,763,747 | 10/1973 | Beichel et al. | 74/424.8 R |
| 3,834,283 | 9/1974 | Beichel et al. | 74/424.8 R |
| 3,989,223 | 11/1976 | Burkhardy et al. | 74/89.15 |
| 4,148,226 | 4/1979 | Benton | 74/459 |
| 4,196,654 | 4/1980 | Stearns | 92/33 |
| 4,199,999 | 4/1980 | Metz | 74/424.8 NA |
| 4,295,384 | 10/1981 | Brandt et al. | 74/424.8 R |
| 4,300,641 | 11/1981 | Kinkel | 92/33 |
| 4,508,016 | 4/1985 | Weyer | 92/33 |

FOREIGN PATENT DOCUMENTS

| | | |
|---|---|---|
| 2901635 | 1/1979 | Fed. Rep. of Germany . |
| 2924536 | 6/1979 | Fed. Rep. of Germany . |
| 8101440 | 5/1981 | World Int. Prop. O. ............. 92/33 |
| 8103199 | 11/1981 | World Int. Prop. O. ............. 92/33 |
| 890440 | 2/1962 | United Kingdom . |

Primary Examiner—Lawrence J. Staab
Assistant Examiner—Michael D. Bednarek
Attorney, Agent, or Firm—Seed and Berry

[57] ABSTRACT

A fluid-powered differential ball screw actuator with torque-transmitting helical ball-carrying races. The actuator includes a body with an interior first ball race and first and second ends; a first stop stationary with respect to the body for engaging and limiting travel of balls along the first ball race toward the first end; and output shaft rotatably supported within the body and having an exterior second ball race; a second stop stationary with respect to the shaft for engaging and limiting travel of balls along the second ball race toward the first end; and a piston reciprocally mounted within the body for application of fluid pressure to produce movement of the piston toward the first or second end. The piston has a sleeve coaxially receiving the shaft, with a third ball race cvonfronting and corresponding to the first ball race to form an outer set of races and a fourth ball race confronting and corresponding to the second ball race to form an inner set of races. The third and fourth ball races extend over a sufficient axial length of the sleeve projecting beyond the first and second stops, respectively, toward the first end, as measured with the piston positioned at its end limit of travel toward the first end, to permit substantially unimpeded rolling travel of balls within the outer and inner sets of races as the piston reciprocates within the body between its end limits of travel. The actuator further has a third and a fourth stop stationary with respect to the sleeve for engaging and collecting balls in the outer and inner sets of races for regrouping balls toward the first stop as the piston travels toward the first end.

46 Claims, 8 Drawing Figures

BALL SCREW ACTUATOR

DESCRIPTION

1. Technical Field

The present invention relates generally to helical actuators, and more particularly, to fluid-powered ball screw actuators.

2. Background Art

Rotary helically splined actuators have been employed in the past to achieve the advantage of high torque output from a simple linear piston and cylinder drive arrangement. For high-torque, high-efficiency applications, the rigid splined helical actuators have been found to have an undesirably high frictional coefficient. While actuators have been constructed using balls and helical ball races, and provide a higher output efficiency due to the rolling friction of balls being less than the sliding friction of splines, conventional helical ball screw actuators require recirculation of the balls as the ball carrier reciprocally moves within the actuator cylinder. The recirculation allows the balls to roll relatively unrestricted within the ball races to avoid the balls scuffing along the races.

While the use of recirculation eliminates most of the ball scuffing problem, it is difficult and expensive to manufacture an actuator with a recirculation path. Furthermore, no recirculation path can provide a totally unrestricted flow of the balls. Additionally, to accommodate the recirculation path, the actuator must be made wider than otherwise necessary since recirculation requires that the recirculation path double back over the ball races carrying the balls.

It will therefore be appreciated that there is a significant need for a fluid-powered helical ball screw actuator which does not require the use of recirculation paths, but still eliminates the scuffing problem. The actuator should provide high-torque, high-efficiency performance, and be relatively easy and inexpensive to manufacture. The present invention fulfills this need, and further provides other related advantages.

DISCLOSURE OF INVENTION

The present invention resides in a fluid-powered ball screw actuator, including an outer elongated body having a torque-transmitting interior first ball race, and first and second ends; a first stop stationary with respect to the body for engaging and limiting travel of balls along the first ball race toward the second end; a shaft disposed within the body and supported for rotation relative thereto, the shaft having a torque-transmitting second ball race; a second stop stationary with respect to the shaft for engaging and limiting travel of balls along the second ball race toward the first end; and a piston reciprocally mounted within the body and having a head for application of fluid pressure to one or the other opposing sides of the head to produce axial movement of the piston toward the first or second end. The piston further has an elongated sleeve coaxially receiving the shaft therein, with a torque-transmitting third ball race corresponding to and confronting the first ball race to form an outer channel, and a torque-transmitting fourth helical ball race corresponding to and confronting the second ball race to form an inner channel. The third and fourth ball races extend over a sufficient axial length of the sleeve projecting beyond the first and second stops, respectively, toward the first end to permit unimpeded rolling travel of the balls within the outer and inner channels as the piston reciprocates between its end limit positions within the body. One or more first balls are seated in the outer channel to a side of the first stop toward the second end for transmitting torque between the body and the piston upon axial movement of the piston by the application of fluid pressure to the head; and a one or more second balls are seated in the inner channel to a side of the second stop toward the second end for transmitting torque between the piston and the shaft upon axial movement of the piston by the application of fluid pressure to the opposite side of the head.

The actuator further includes a third stop stationary with respect to the sleeve to a side of the first balls toward the second end for engaging and collecting balls in the outer channel for regrouping toward the first stop as the piston travels toward the first end; and a fourth stop stationary with respect to the sleeve to a side of the second balls toward the second end for engaging and collecting balls in the inner channel for regrouping toward the second stop as the piston travels toward the first end.

The third and fourth ball races extend over an axial length of the sleeve projecting beyond the first and second stops toward the first end substantially one-half or more of the distance of the end-to-end axial travel of the piston within the body, as measured with the piston positioned at its end limit of travel toward the first end. Similarly, the first and second ball races extend over an axial length of the body and shaft beyond the third and fourth stops, respectively, toward the second end substantially one-half or more of the distance of the end-to-end axial travel of the piston within the body, as measured with the piston positioned at its end limit of travel toward the first end. In the presently preferred embodiment of the invention, the ball races forming at least the outer or inner channels are helical. The lead angle of the inner and outer channels is at least four degrees.

The first and second balls substantially fill the outer channel between the first and third stops and the inner channel between the second fourth stops, respectively, when the piston is positioned at its end limit of travel toward the first end. The first and second stops project into the first and second races, respectively, and the third stop is a pin extending laterally through the sleeve and projecting into the third and fourth races.

In an alternative embodiment of the invention, each of the first through fourth ball races is replaced with a plurality of ball races, and the first through fourth stops are replaced with a plurality of stops corresponding with the ball races. The ball races of the first or third plurality of ball races, and the ball races of the second or fourth plurality of ball races, are longitudinally offset from each other, with adjacent pairs of the first or third plurality of ball races, and adjacent pairs of the second or fourth plurality of ball races, being offset sufficiently with respect to the corresponding races to substantially eliminate free play between the body and the piston, and between the piston and the shaft.

In several disclosed embodiments of the invention, the first ball race is formed on an interior sidewall of the body. In another embodiment, the ball race is formed on an insert positioned within and fixedly attached to the body. The insert is a collar, with the first ball run formed on an interior wall thereof. The collar is concentrically held within the body by a plurality of circumferentially spaced retainers longitudinally extending between the insert and the body. In this embodiment, the first stop is a ring concentrically positioned within the body between an end of the insert toward the first end and the body, with the ring being retained against axial movement and having an interior circumferential edge portion projecting inwardly sufficient to block travel of the balls in the outer channel toward the first end beyond the insert.

In some embodiments of the invention, the stops are pins projecting to block the travel of balls in the ball races, with the second stop being fixedly attached to the shaft for rotary travel therewith. In another alternative embodiment of the invention, the second stop is a portion of the body substantially abutting an end of the second ball race toward the first end of the actuator to block the travel of balls. In this embodiment, the shaft is a rotatable member having a generally annular shape, with the second ball race being formed on a sidewall thereof opposing the sleeve. The annular member has opposing radially extending end walls and the body has a wall portion confronting each of the end walls. The end walls and body wall portions have corresponding circular grooves therein with ball bearings disposed therebetween for rotatably supporting the member relative to the body. The piston has a pair of opposing heads for the application of fluid pressure thereto, with the sleeve extending between the heads.

Other features and advantages of the invention will become apparent from the following detailed description, taken in conjunction with the accompanying drawings.

BEST MODE FOR CARRYING OUT THE INVENTION

Figure 1:
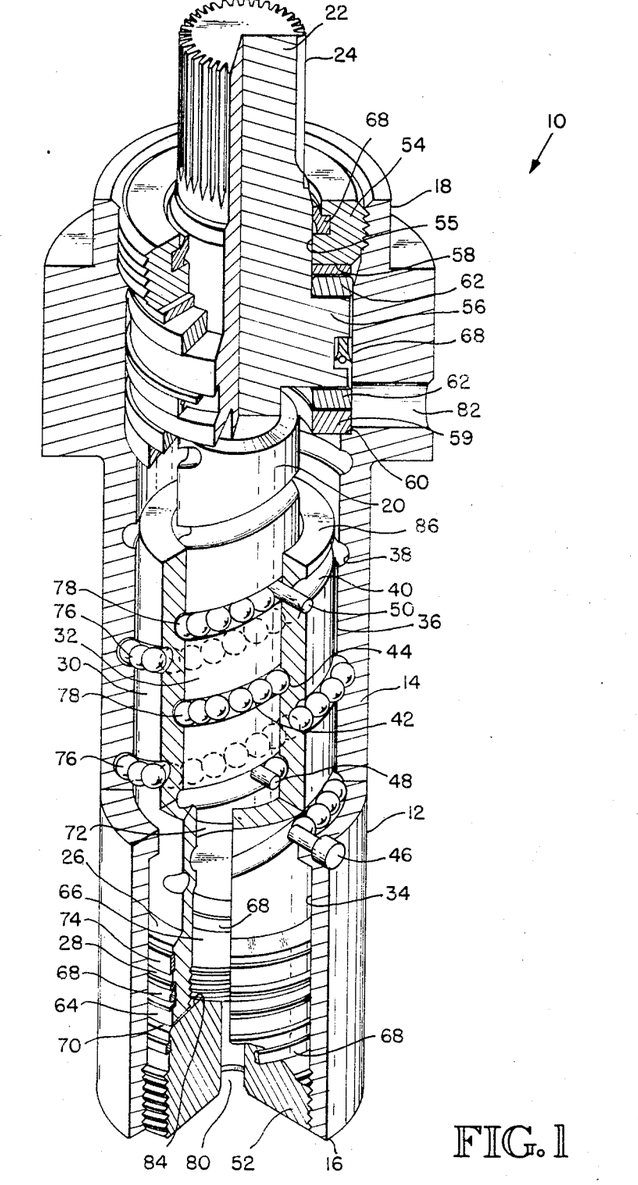
FIG. 1 is a sectional isometric view of a single-start, fluid-powered, differential helical ball screw actuator embodying the present invention.

As shown in the drawings for purposes of illustration, the present invention is embodied in a fluid-powered helical ball screw actuator, indicated generally by reference numeral 10. The actuator 10 includes an elongated body or housing 12 having a cylindrical sidewall 14 with a first end 16 and a second end 18. Rotatably mounted within the body 12 and extending longitudinally therein is a rotary output shaft 20. A drive end portion 22 of the shaft 20 projects outwardly beyond the second end 18 of the body 12 and is provided with splines 24 for coupling to another device (not shown) to provide rotational drive thereto. A piston 26 is reciprocally mounted within the body 12 and includes a head 28 and an elongated sleeve 30. The sleeve 30 extends longitudinally within the body 12 and is radially positioned inward of the body sidewall 14. An end portion 32 of the shaft 20 toward the first end 16 of the body 12 is coaxially received within the sleeve 30.

The actuator 10 provides relative rotational movement between the body 12 and the shaft 20 through conversion of linear movement of the piston 26 to rotational movement of the shaft, as will be hereinafter described. It is to be understood that the invention may be practiced in an actuator having a shaft projecting outward at both ends of the body, which requires that the shaft extend through the piston in sealed relation thereto. Also, the actuator may be used with the drive end portion of the shaft 20 being held stationary, with the rotational drive being provided by rotation of the body 12.

In the embodiment of the invention illustrated, the body sidewall 14 is provided with a smooth interior bore portion 34 positioned toward the first end 16 and having sufficient length to accommodate the full stroke of the piston 26. Extending along a midportion 36 of the body sidewall 14 and formed integrally thereon is an interior helical ball race 38. While the ball race 38 is described herein as formed directly on the sidewall 14, the ball race may also be formed on a hardened insert fixedly attached within the interior of the body 12. The sleeve 30 has an exterior helical ball race 40 confronting and corresponding to the interior ball race 38 of the body 12. The interior ball race 38 of the body 12 and the exterior ball race 40 of the sleeve 30 have substantially identical lead and pitch, and form a laterally confined, variable-length outer channel, defined by the area of coincidence of the two ball races as the piston 26 moves axially within the body.

The end portion 32 of the shaft 20 is also provided with an exterior helical ball race 42. The sleeve 30 has an interior helical ball race 44 confronting and corresponding to the ball race 42 of the shaft 20. The interior ball race 44 of the sleeve 30 and the exterior ball race 42 of the shaft 20 have substantially identical lead and itch, and form a laterally confined, variable-length inner channel, defined by the area of coincidence of the two ball races as the piston 26 moves axially within the body 12. The midportion 36 of the body sidewall 14, the sleeve 30 and the end portion 32 of the shaft 20 are diametrically sized to provide minimal interspacing to increase ball contact with the outer and inner channels and promote torque transmission by the balls carried therein, and to increase the axial load-carrying ability of the actuator 10.

A first stop 46 is attached to the body 12 and projects into the interior ball race 38 of the body for engaging and limiting travel of balls through the outer channel formed by the ball races 38 and 40. The first stop 46 is stationary with respect to the body 12 and positioned adjacent to the smooth bore portion 34 of the body sidewall 14 to prevent balls traveling through the outer channel toward the first end 16 from entering the space between the smooth bore portion and the sleeve 30. A similarly arranged second stop 48 is attached to the end portion 32 of the shaft 20 and projects into the exterior ball race 42 of the shaft for engaging and limiting travel of balls through the inner channel formed by the ball races 42 and 44. The second stop 48 is stationary with respect to the shaft 20 and rotates therewith to prevent entry of balls traveling through the inner channel toward the first end 16 from entering the interior space of the sleeve 30.

A stop pin 50 extends laterally through the sleeve 30 at an end portion 51 of the sleeve remote from the head 28 and has its two free ends projecting into both the exterior ball race 40 and the interior ball race 44 of the sleeve 30. The pin 50 is stationary with respect to sleeve 30 and travels therewith for engaging and collecting balls in the outer and inner channels to regroup the balls toward the first and second stops 46 and 48, respectively, as the piston 26 travels toward the first end 16. It is noted that the pin 50 will only operate to regroup the balls in the channels toward the stops 46 and 48 should they not roll back fully against the stops when the piston 26 completes its travel to the first end 16. While the stops 46, 48 and 50 are shown and described as pins or other separate members projecting into the various ball races, the stops may be constructed integral with the races, such as by use of the end walls of the races.

A threaded first end cap 52 is positioned at the first end 16 of the body 12, and a threaded second end cap 54 is positioned at the second end 18 of the body. The shaft 20 extends through an aperture 55 in the second end cap 54. The shaft 20 is provided with a radially extending flange 56 positioned between an inward face 58 of the second end cap 54 and a retaining ring 59 held in position by a radially extending stop shoulder 60 of the body 12 to prevent axial movement of the shaft within the body. Thrust bearings 62 are disposed to each side of the shaft flange 56 between the second end cap 54 and the retaining ring 59 to facilitate rotational movement of the shaft within the body.

Figure 2:
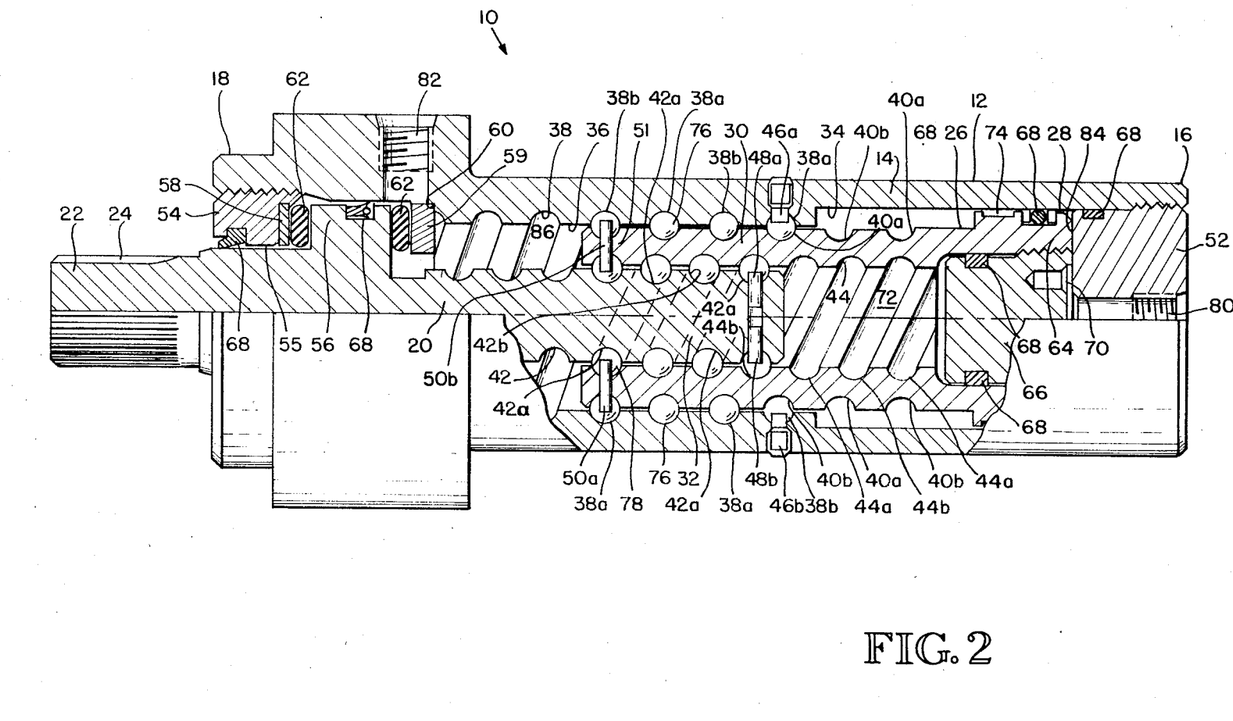
FIG. 2 is a side elevational, sectional view of an alternative embodiment of the invention utilizing double-start ball races, with the piston in a rightmost position.
Figure 3:
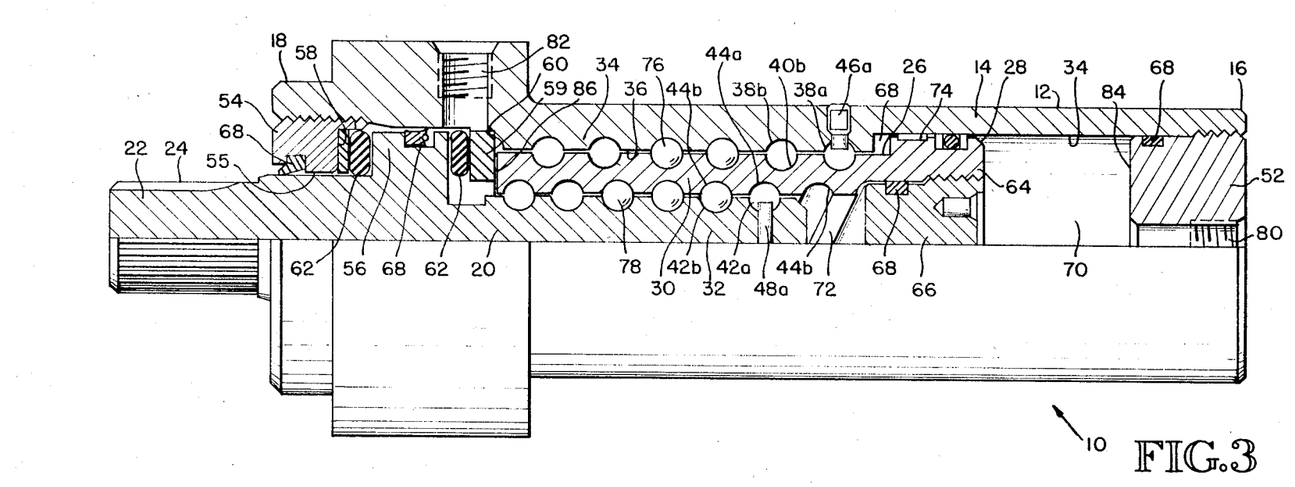
FIG. 3 is another view the actuator of FIG. 2, showing the piston in a leftmost position.

In the preferred embodiment of the invention illustrated in FIGS. 1-3, the piston 26 has a two-piece head with an enlarged diameter, interiorly threaded ring 64 formed integrally with the sleeve 30 and an exteriorly threaded plug 66 received therein. Conventional seals 68 are provided between the various components described above to provide a pair of fluid-tight compartments 70 and 72 to each side of the piston head 28, one toward the first end 16 and one toward the second end 18, respectively. A low-friction piston ring bearing 74 is disposed between the piston head 28 and the smooth bore portion 34 of the body sidewall 14.

A plurality of balls 76 are seated in the outer channel between the first stop 46 and the pin 50 and in rolling engagement therewith, and a plurality of balls 78 are seated in the inner channel between the second stop 48 and the pin 50 and in rolling engagement therewith. The balls 76 in the outer channel transmit torque between the body 12 and the piston 26, and the balls 78 in the inner channel transmit torque between the piston and the shaft 20 upon movement of the piston by the application of fluid pressure to the actuator 10.

Reciprocation of the piston 26 within the body 12 occurs when hydraulic fluid or air under pressure enters through a first port 80 in the first end cap 52, which communicates with the chamber 70, or through a second port 82 in the body sidewall 14 to the other side of the piston 26, which communicates with the chamber 72. As the piston 26, and the sleeve 30 forming a part thereof, linearly reciprocate in an axial direction within the body 12, torque is transmitted by the balls 76 through the coaction of the interior ball races 38 of the body 12 and the exterior ball races 40 of the sleeve to cause rotation of the sleeve. The linear and rotational movement of the sleeve 30 is transmitted by the balls 78 through the coaction of the exterior ball races 42 of the shaft 20 and the interior ball races 44 of the sleeve 30 to transmit torque to the shaft and cause its rotation. Since the axial movement of the shaft 20 is restricted, axial movement of the piston 26 is converted into relative rotational movement between the body 12 and the shaft.

The axial movement of the piston 26 within the body 12 toward the first end 16 is limited by the piston head 28 engaging an inward face 84 of the first end cap 52, and movement toward the second end 18 is limited by a radial end wall 86 of the sleeve 30 toward the second 18 engaging the retaining ring 59. With the piston 26 positioned at its end limit of travel toward the first end 16, as shown in FIG. 2, the outer and inner channels have a sufficient quantity of the balls 76 and 78 therein to substantially fill the channels between the stops 46, 48 and 50. It is noted that while the actuator 10 of FIGS. 2 and 3 use double-start ball races, which will be described in more detail hereinafter, the principles of operation are generally the same and the components are correspondingly numbered with the components of the single-start actuator of FIG. 1.

Again, as measured with the piston 26 positioned at its end limit of travel toward the first end 16, the exterior ball race 40 and the interior ball race 44 of the sleeve 30 extend over an axial length of the sleeve projecting beyond the first and second stops 46 and 48, respectively, toward the first end 16, at least one-half of the distance of the end-to-end axial travel of the piston 26 within the body 12. The balls 76 and 78 disposed in the inner and outer channels travel along the channels as they roll approximately one-half the distance the sleeve 30 travels with respect to the body 12 and the shaft 20, respectively, as the piston 26 is moved from one end limit of travel adjacent to the first end cap 52 to the other end limit of travel toward the second end 18. To accommodate the slower travel of the balls 76 and 78, the ball races 40 and 44 of the sleeve 30 must extend over a sufficient portion of the sleeve to the right of the stops 46 and 48, as the actuator 10 is viewed in FIGS. 2-3, to allow free rolling of the balls within the outer and inner channels during the entire piston travel and thereby avoid scuffing of the balls. It is noted that, if desired, the ball races 40 and 44 may extend further beyond stops 46 and 48, and that if the first and second stops 46 and 48 project sufficiently to enter the ball races 40 and 44, respectively, the ball races must extend over an axial length of the sleeve 30 beyond the first and second stops toward the first end 16 by at least the distance of the end-to-end axial travel of the piston 26, or other recess means must be provided to avoid the first and second stops impeding the piston travel toward the second end 18.

For reasons similar to those discussed above, the interior ball race 38 of the body 12 and the exterior ball race 42 of the shaft 20 extend over an axial length of the body and shaft beyond the pin 50 toward the second end 18 at least one-half of the distance of the end-to-end axial travel of the piston 26 within the body, as measured with the piston postioned at its end limit of travel toward the first end 16. In effect, the outer and inner channels axially expand and contract as the piston 26 moves between its end limits of travel. It is noted that, if desired, the ball races 38 and 42 may extend further beyond the pin 50, and that if the pin 50 projects sufficiently to enter the ball races 38 and 42, the ball races must extend over an axial length of the body 12 and the shaft 20 beyond the pin toward the second end 18 by at least the distance of the end-to-end axial travel of the piston 26, or other recess means must be provided to avoid the pin impeding the piston travel toward the second end 18.

The ball races 38, 40, 42 and 44, forming the outer and inner channels, may have the same hand or angular direction to provide relative rotational movement between the body 12 and the shaft 20 based upon the differential rotation between the sleeve 30 and the shaft resulting from the axial movement of the piston 26. For example, during a stroke of the piston 26 from the first end 16 toward the second end 18, by the application of fluid pressure to the chamber 70, the sleeve 30 will rotate counterclockwise relative to the body 12, as viewed from the second end of the body, and the shaft 20 will rotate clockwise relative to the sleeve. The resultant rotation of the shaft 20 relative to the body 12 is the difference between the amounts of these opposite rotations. By selection of the leads for the ball races 38 and 40 (forming the outer channel) and the ball races 42 and 44 (forming the inner channel), "lead" being defined as the axial distance traveled by a ball as it rolls one complete revolution along a ball race, and by the use of differential rotation, the direction and amount of rotation of the shaft 20 can be carefully selected during the design of the actuator 10.

The use of differential rotation further provides the advantage of being able to use ball races with larger lead angles without undesirably increasing the rotational output of the actuator 10. The larger the "lead angle," defined as the arc tangent of the ball race lead divided by the product of the ball race pitch-diameter times pi, the more the energy applied to the actuator 10 by the fluid pressure will be converted into torque rather than inefficient thrust. The present invention is not, however, limited to differential rotation, and the outer and inner channels may have the opposite hand or angular direction to provide compound rotational movement of the body 12 and the shaft 20 in situations where greater output rotation is desired. Furthermore, the invention may be practiced with the ball races of only one of the outer or inner channels being helical, with the ball races of the other channel being longitudinally straight and contributing no rotation.

In order to further increase the overall lead angle of the ball races, the actuator 10 of the embodiment of the invention shown in FIGS. 2 and 3 utilizes pairs of ball races in double-start relationship, with both races of a pair having a substantially equal lead angle. As more clearly shown in FIG. 2, the races 38, 40, 42 and 44 each comprise a pair of double-start ball races indicated by the letters "a" and "b" used with the numeral identifying the ball race. Stops corresponding to the first, second and third stops 46, 48 and 50 described above are also provided and are indicated by the letters "a" and "b", depending upon which one of the pair of ball races is involved.

Using a pair of double-start ball races instead of one single-start ball race effectively allows doubling of the lead angle for the ball races without decreasing the overall number of balls used. Maintaining a minimum number of balls is desirable because the balls also serve to provide lateral bearing surfaces to maintain the radial distance between the actuator components and because less torque must be transmittted through each ball. In practice, lead angles in excess of 4 to 6 degrees are desired, and lead angles of about 15 degrees are preferred.

Figure 4:
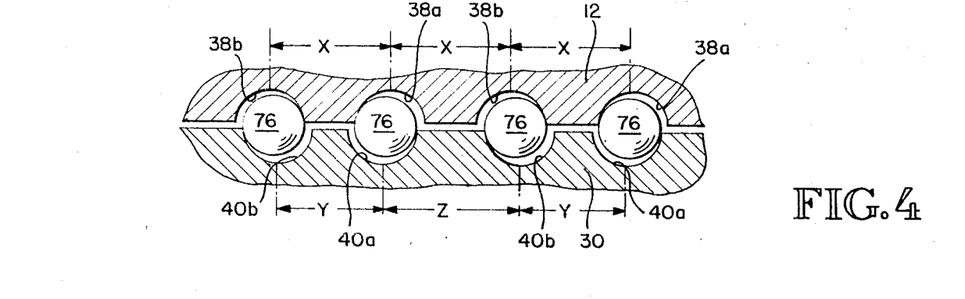
FIG. 4 is an enlarged, fragmentary sectional side view of the actuator shown in FIG. 2, showing confronting double-start ball races, with one pair of races being longitudinally offset to eliminate free play.

To avoid the problem of backlash, which produces angular play as a result of the use of ball races having a diameter larger than the balls seated therein, the actuator 10 may be manufactured with the double-start ball races of one member having an even longitudinal spacing to provide a uniform pitch between successive ball races (indicated in FIG. 4 by the letter "X"), and the confronting double-start ball races of an opposing member having a longitudinally offset spacing to provide alternating pitch between successive corresponding points on adjacent ball races (indicated by the letters "Y" and "Z"). Such an arrangement is shown in FIG. 4 for the body 12 and the sleeve 30 for the ball races 38a and 38b, and 40a and 40b forming the outer channels with the balls 76 therein. The offset spacing is chosen to substantially eliminate free play between the body 12 and the sleeve 30 by binding the balls 76 between the outward sidewalls of the adjacent ball races 40a and 40b, and the inward sidewalls of the adjacent ball races 38a and 38b, as the pairs of races are viewed in FIG. 4. It is noted that this same approach may be used with actuators having more than single-start ball races, and it is best used with actuators having an even number of ball race starts.

Figures 5, 6:
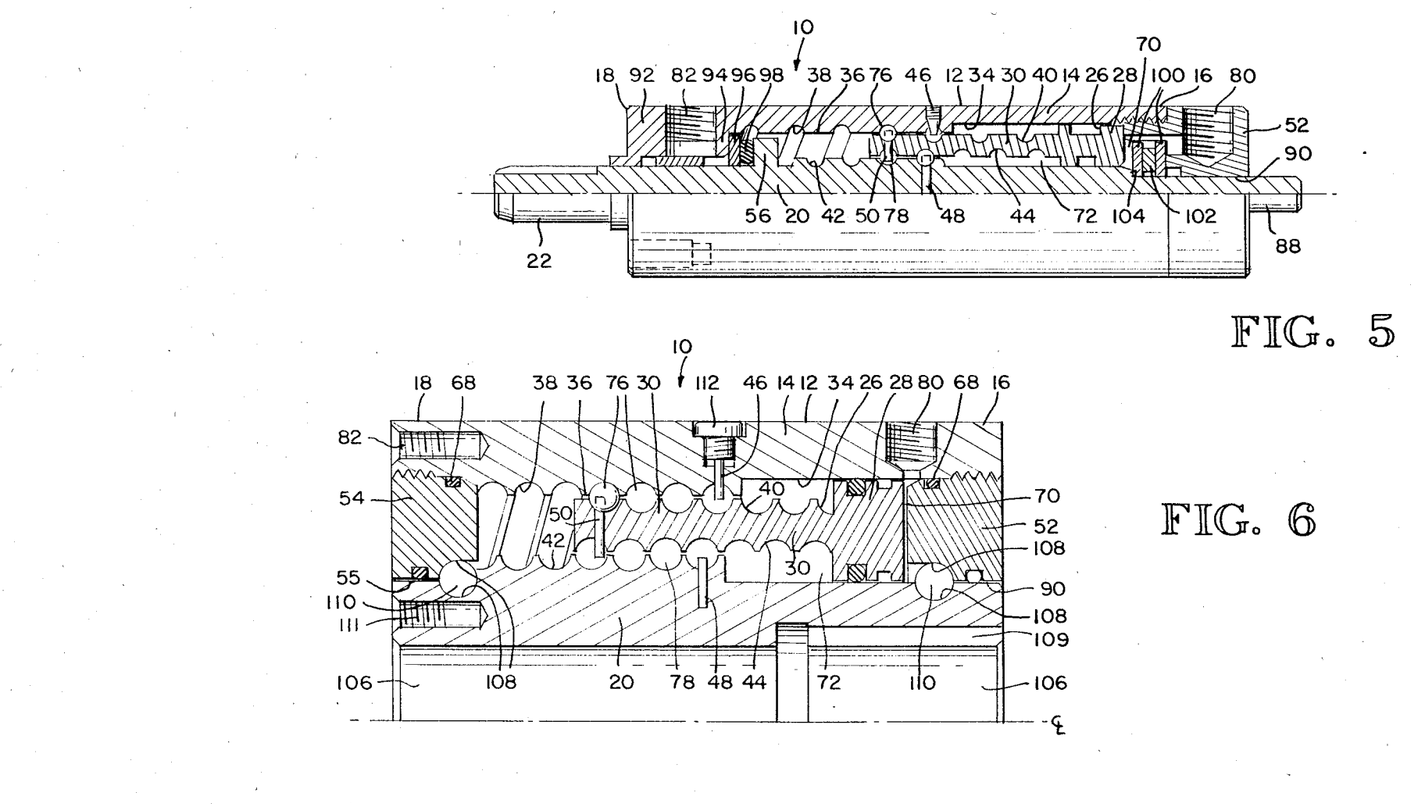
FIG. 5 is a side elevational, sectional view of a second alternative embodiment of the invention, with a rotary shaft extending through both end caps and the piston head.
FIG. 6 is a partial side elevational, sectional view of a third alternative embodiment of the invention with a hollow shaft, showing the portion to one side of the longitudinal center line.

An alternative embodiment of the invention is shown in FIG. 5 utilizing single-start ball races 38, 40, 42 and 44, with the shaft 20 having a reduced diameter shaft end portion 88 extending through the head 28, and through and beyond an aperture 90 in the first end cap 52. The shaft end portion 88 may be used for attachment of a position-sensing means (not shown) to provide an indication of rotation or a control. The actuator 10 of this embodiment has a body 12 with a radially inward extending end wall 92 at the second end 18 of the actuator in lieu of a removable end cap. A radially inward extending stop shoulder 94, positioned inward of the end wall 92, is provided to engage the flange 56 of the shaft 20 and limit the axial movement of the shaft toward the second end 18. A thrust ring 96 and a thrust bearing 98 are positioned between the flange 56 and the stop shoulder 94. A pair of thrust rings 100 with a thrust bearing 102 therebetween are provided toward the first end 16 adjacent to the first end cap 52 to engage a stop shoulder 104 formed on the shaft 20 and defining the reduced diameter shaft end portion 88, and to limit axial movement of the shaft toward the first end.

Another alternative embodiment is shown in FIG. 6 wherein the shaft 20 has a hollow interior 106, with the shaft extending through the head 28, and through but not beyond, the first and second end caps 52 and 54. The actuator 10 of this embodiment uses corresponding grooves 108 formed in each of the end caps 52 and the shaft 20 which contain ball bearings 110 to limit axial movement of the shaft and to further provide lateral support and rotatably retain the shaft within the body 12. It is noted that with this embodiment, if the shaft 20 is held stationary, the fluid ports 80 and 82 may conveniently extend through the hollow interior 106 of the shaft to the interior of the body and fluid lines connected to the ports may exit through either end of the shaft. The shaft 20 has a keyway 109 formed along its hollow interior toward the first end 16 for connection of the shaft to another device (not shown), and has a threaded recess 111 toward the second end 18 for connection to another device. The first stop 46 is a pin held in place by a screw 112.

Figure 7:
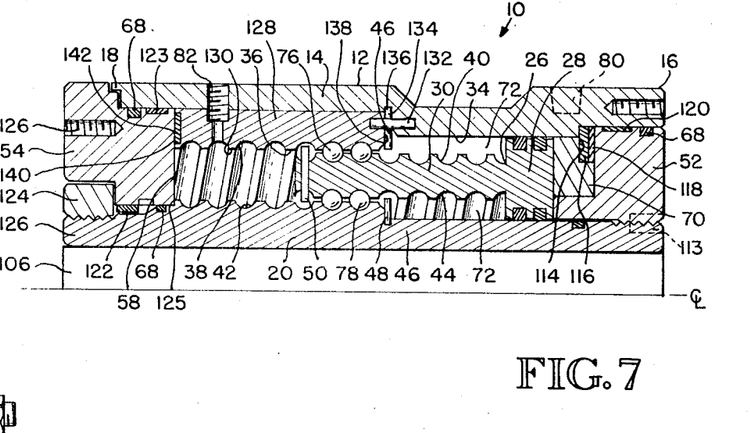
FIG. 7 is a partial side elevational sectional view of a fourth alternative embodiment of the invention with a hollow shaft and a body insert with ball races, showing the portion to one side of the longitudinal center line.

Yet another alternative embodiment of the invention is shown in FIG. 7, wherein the shaft 20 is hollow and extends through the head 28, and through but not beyond the first and second end caps 52 and 54. The shaft 20 is threadedly attached to the first end cap 52 and the first end cap is fixed for rotation with the shaft by a set screw 113. The body 12 has a radially inward extending stop shoulder 114 positioned inward of the first end cap 52 and provided to engage the first end cap for limiting the axial movement of the shaft toward the second end 18. A radial bearing 120 is disposed between the sidewall of the first end cap 52 and the body 12. A retaining ring 116 and a thrust bearing 118 are positioned between the first end cap 52 and the shoulder 114.

The shaft 20 and the second end cap 54 have corresponding splines 122 which are in engagement to cause the second end cap to rotate with the shaft. A radial bearing 123 is disposed between the sidewall of the second end cap 5 and the body 12. The second end cap 54 is retained in position at the second end 18 by a nut 124 threadedly attached to an end portion 126 of the shaft 20 at the second end 18. The nut 124 maintains the inward face 58 of the second end cap 54 against a radially outward extending shoulder 125 of the shaft 20. Threaded recesses 126 are provided in the second end cap 54 for attachment of the actuator 10 to an external device or support frame (not shown).

In the embodiment of FIG. 7, the first ball race 38 is formed on a hardened insert 128, and the body 12 may be manufactured of aluminum. The insert 128 has a collar shape, with the first ball race 38 being formed on an interior wall 130. The collar-shaped insert 128 is concentrically positioned and held stationary within the body 12 by a plurality of circumferentially spaced pins 132 longitudinally extending between the insert and the body. A radially inward extending shoulder 134 formed on the interior wall of the body 12 facing toward the second end 18 holds the insert 128 against axial movement toward the first end 16. A ring 136 is disposed between the shoulder 134 and an end wall 138 of the insert 128 facing toward the first end 16. The ring 136 is concentrically positioned within the body 12 and is held in place against axial movement by the insert 128 and the shoulder 134 and against rotation by the pins 132 passing through the ring. A circumferential interior edge portion of the ring 136 projects inward sufficiently to form the first stop 46 and limit travel of the balls 76 in the outer channel toward the first end 16, but not so far as to project into the ball race 40 formed on the sleeve 30.

Axial movement of the insert 128 toward the second end 18 is limited by the inward wall of the second end cap 54. A thrust bearing 140 is disposed between an end wall 142 of the insert 128 facing toward the second end 18 and the inward face 58 of the second end cap 54. Axial movement of the shaft 20 toward the first end 16 is limited by the inward face 58 of the second end cap 54 engaging the end wall 142 of the insert, with the second end cap being held in fixed position relative to the shaft by the nut 124.

Figure 8:
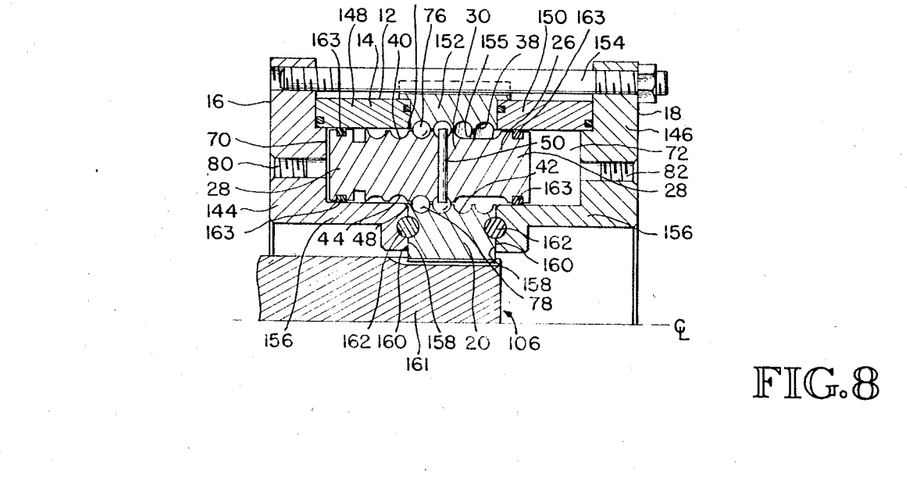
FIG. 8 is a partial side elevational sectional view of a fifth alternative embodiment of the invention with a hollow shaft of lesser length rotatably supported by ball bearings between interior body walls, showing the portion to one side of the longitudinal center line.

In the alternative embodiment of the invention shown in FIG. 8, the shaft 20 has a reduced length of less than the axial length of the body 12 and has the hollow interior 106 to form an annular-shaped member. The body 12 is formed by two circular end frames 144 and 146, with the cylindrical sidewall 14 formed by two sidewall sections 148 and 150 with a hardened midsection 152 therebetween. The sidewall sections 148 and 150 and the midsection 152 are held clamped in place between the end frames 144 and 146 by tie rods 154, which fit in longitudinal grooves in the exterior wall of the midsection to prevent its rotation relative to the remainder of the body 12. The first ball race 38 is formed on an interior wall 155 of the midsection 152.

The end frames 144 and 146 each have an inwardly projecting, circular interior wall 156 positioned radially inward from the cylindrical sidewall 14. The interior walls 146 each have a radially extending opposing face 158 spaced apart from the face of the other interior wall, with a circular groove formed therein. The annular-shaped shaft 20 is positioned therebetween and has opposing radially extending end walls 160 facing toward the faces 158 of the body interior walls 156. The shaft end walls 160 have circular grooves therein confronting and corresponding to the grooves of the body faces 158, with ball thrust bearings 162 disposed therebetween for rotatably supporting the shaft 20 relative to the body 12. The hollow interior 106 of the shaft 20 is splined for connection to a splined shaft 161 of an external device.

It is noted that the actuator 10 may also be constructed with the position of the annular-shaped shaft 20 and the midsection 152 reversed. The midsection 152 would be clamped between the interior walls 156 of the body 12, the annular shaft 20 would be rotatably supported by the ball bearings 162 between the sidewall sections 148 and 150 of the sidewall 14. In this embodiment, the annular shaft 20 would have the shape of a circular flange with an outwardly projecting exterior rim for attachment to an external device.

In the embodiment of FIG. 8, the piston 26 is positioned for reciprocal movement within the annular chamber formed between the body sidewall 14 and the interior walls 156, and has two opposing heads 28, with the sleeve 30 extending therebetween. Conventional seals 163 are disposed between the piston heads 28 and the respective sidewall portions 148 and 150 of the sidewall 14 and the interior walls 156 to define the compartments 70 and 72 to which fluid pressure is applied to move the piston 26. In such manner, the channels formed by the ball races 38, 40, 42 and 44 need not be pressurized and a fitting (not shown) may be provided for the application of grease to the ball race channels which communicate with the grooves containing the ball bearings 162 for the application of grease thereto.

The first stop 46 is formed by a beveled interior wall portion of the sidewall section 148 abutting the end of the first ball race 38 toward the first end 16. Similarly, the second stop 48 is formed by a beveled interior wall portion of the interior wall 156 abutting the end of the second ball race 42 toward the first end 16.

It will be appreciated that, although specific embodiments of the invention have been described herein for purposes of illustration, various modifications may be made without departing from the spirit and scope of the invention, accordingly the invention is not limited except by the appended claims.

I claim:

1. A fluid-powered helical ball screw actuator, comprising:
    an outer elongated body having torque-transmitting interior first and second helical ball races in double-start relation with substantially equal lead angles, said body further having first and second ends;

first and second stops stationary with respect to said body for engaging and limiting travel of balls along said first and second ball races, respectively, toward said first end;

a shaft disposed within said body and supported for rotation relative thereto, said shaft having torque-transmitting exterior third and fourth helical ball races in double-start relation with substantially equal lead angles;

third and fourth stops stationary with respect to said shaft for engaging and limiting travel of balls along said third and fourth ball races, respectively, toward said first end;

a piston reciprocally mounted within said body and having a head for application of fluid pressure to one or the other opposing sides of said head to produce axial movement of said piston toward said first or second end, said piston further having an elongated sleeve coaxially receiving said shaft therein, with torque-transmitting exterior fifth and sixth helical ball races confronting and corresponding to said first and second ball races, respectively, to form first and second outer sets of races and with torque-transmitting interior seventh and eighth helical ball races confronting and corresponding to said third and fourth ball races to form first and second inner sets of races, said fifth, sixth, seventh and eighth ball races extending over an axial length of said sleeve projecting beyond said first, second, third and fourth stops, respectively, toward said first end substantially one-half or more of the distance of the end-to-end axial travel of said piston within said body, as measured with said piston positioned at its end limit of travel toward said first end;

fifth and sixth stops stationary with respect to said sleeve for engaging and collecting balls in said first and second outer sets of races, respectively, for regrouping toward said first and second stops as said piston travels toward said first end;

a plurality of balls seated in each of said first and second outer sets of races between said first and fifth stops and between said second and sixth stops for transmitting torque between said body and said piston upon axial movement of said piston by the application of fluid pressure to said head;

seventh and eighth stops stationary with respect to said sleeve for engaging and collecting balls in said first and second inner sets of races, respectively, for regrouping toward said third and fourth stops as said piston travels toward said first end; and a plurality of balls seated in each of said first and second inner sets of ball races between said third and seventh stops and between said fourth and eighth stops for transmitting torque between said piston and said shaft upon axial movement of said piston by the application of fluid pressure to said head, whereby relative rotational movement between said body and said shaft can be achieved by the selective application of fluid pressure.

2. The actuator of claim 1 wherein either said first and second ball races, or said fifth and sixth ball races, have an even longitudinal spacing to provide a uniform pitch therebetween, and the other pair of said ball races have longitudinally offset spacing to provide alternating pitch between successive corresponding points on adjacent races, said offset spacing being sufficient to substantially eliminate angular free play between said body and said piston.

3. The actuator of claim 1 wherein either said third an fourth ball races, or said seventh and eighth ball races, have an even longitudinal spacing to provide a uniform pitch therebetween, and the other pair of said ball races have longitudinally offset spacing to provide alternating pitch between successive corresponding points on adjacent races, said offset spacing being sufficient to substantially eliminate angular free play betwen said piston and said shaft.

4. The actuator of claim 1 wherein said inner and outer sets of races each have a lead angle of at least four degrees.

5. A fluid-powered ball screw actuator, comprising:

a body having a first plurality of torque-transmitting ball races, and first and second ends;

a plurality of first stops axially stationary with respect to said body for engaging and limiting travel of balls along said first plurality of ball race toward said first end;

a rotatable member supported by said body for rotation relative thereto, said member having a second plurality of torque-transmitting ball races;

a plurality of second stops axially stationary with respect to said member for engaging and limiting travel of balls along said second plurality of ball races toward said first end;

a piston reciprocally mounted within said body for application of fluid pressure to one or the other opposing sides thereof to produce axial movement of said piston toward said first or second end, said piston having an elongated sleeve positioned between said first and second plurality of ball races, with a third plurality of torque-transmitting ball races confronting and corresponding to said first plurality of ball races to form a plurality of first sets of races and a fourth plurality of torque-transmitting ball races confronting and corresponding to said second plurality of ball races to form a plurality of second sets of races, at least said plurality of first or second sets of races being helical, said plurality of third and fourth ball races extending over a sufficient axial length of said sleeve projecting beyond said first and second stops, respectively, toward said first end to permit substantially unimpeded rolling travel of balls within said first and second sets of races toward said second end as said piston travels from an end limit of travel at said first end to an end limit of travel at said second end;

a plurality of third stops axially stationary with respect to said sleeve for engaging and collecting balls in said plurality of first sets of races for regrouping toward said first stops as said piston travels toward said first end;

one or more balls seated in each of said plurality of first sets of races between said first and third stops for transmitting torque between said body and said piston upon axial movement of said piston by the application of fluid pressure to said head; and a plurality of fourth stops axially stationary with respect to said sleeve for engaging and collecting balls in said plurality of second sets of races for regrouping toward said second stops as said piston travels toward said first end; and one or more balls seated in each of said plurality of second sets of races between said second and fourth stops for transmitting torque between said piston and said member upon axial movement of said piston by the application of fluid pressure thereto.

6. The actuator of claim 5 wherein said plurality of first, second, third and fourth ball races each include an even number of races.

7. The actuator of claim 5 whrein said first and second sets of races are helical and each has a lead angle of at least four degrees.

8. The actuator of claim 5 wherein said balls substantially fill said plurality of first sets of races between said first and third stops and said plurality of second sets of races between said second and fourth stops when said piston is positioned at said end limit of travel toward said first end.

9. The actuator of claim 5 wherein said first and second sets of races are helical.

10. The actuator of claim 9 wherein said first or said third plurality of ball races, and said second or said fourth plurality of ball races are longitudinally offset from the other, with adjacent pairs of said first or third plurality of ball races, and adjacent pairs of said second or fourth plurality of ball races being offset sufficiently with respect to the corresponding races to substantially eliminate free play between said body and said piston, and between said piston and said member.

11. A fluid-powered ball screw actuator, comprising:
an outer elongated body having a torque-transmitting interior first ball race, and first and second ends;
a first stop stationary with respect to said body for engaging and limiting travel of balls along said first ball race toward said first end;
a shaft disposed within said body and supported for rotation relative thereto, said shaft having a torque-transmitting exterior second ball race;
a second stop stationary with respect to said shaft for engaging and limiting travel of balls along said second ball race toward said first end;
a piston reciprocally mounted within said body and having a head for application of fluid pressure to one or the other opposing sides of said head to produce axial movement of said piston toward said first or second end, said piston further having an elongated sleeve coaxially receiving said shaft therein, with a torque-transmitting exterior third ball race confronting and corresponding to said first ball race to form an outer set of races and a torque-transmitting interior fourth ball race confronting and corresponding to said second ball race to form an inner set of races, at least one of said outer or inner sets of races being helical, said third and fourth ball races extending over an axial length of said sleeve projecting beyond said first and second stops, respectively, toward said first end, as measured with said piston positioned at its end limit of travel toward said first end, substantially one-half or more of the distance of the end-to-end axial travel of said piston within said body;
a third stop stationary with respect to said sleeve for engaging and collecting balls in said outer set of races for regrouping toward said first stop as said piston travels toward said first end;
one or more first balls seated in said outer set of races between said first and third stops for transmitting torque between said body and said piston upon axial movement of said piston by the application of fluid pressure to said head;
a fourth stop stationary with respect to said sleeve for engaging and collecting balls in said inner set of races for regrouping toward said second stop as said piston travels toward said first end; and
one or more second balls seated in said inner set of ball races between said second and fourth stops for transmitting torque between said piston and said shaft upon axial movement of said piston by the application of fluid pressure to said head, whereby relative rotational movement between said body and said shaft can be achieved by the selective application of fluid pressure.

12. The actuator of claim 11 wherein said at least one helical inner or outer set of races each has a lead angle of at least four degrees.

13. The actuator of claim 11 wherein said outer and inner sets of races are helical.

14. The actuator of claim 11 wherein said first and second balls substantially fills said outer set of ball races between said first and third stops, and said inner set of ball races between said second and fourth stops, respectively, when said piston is positioned at its end limit of travel toward said first end, and said first and second ball races extend over an axial length of said body and shaft beyond said third and fourth stops, respectively, toward said second end when said piston is so positioned, substantially one-half or more of the distance of the end-to-end axial travel of said piston within said body.

15. The actuator of claim 11 wherein said first stop is a first member attached to said body and projecting into said first race, said second stop is a second member attached to said shaft and projecting into said second race, said third stop is a third member attached to said piston and projecting into said third race, and said fourth stop is a fourth member attached to said piston and projecting into said fourth race.

16. The actuator of claim 15 wherein said third and fourth members comprise a pin extending laterally through said sleeve.

17. The actuator of claim 15 wherein said projecting first and second stops each have ball-engaging portions confined within said first and second races, respectively.

18. The actuator of claim 11 wherein said first ball race is formed on an interior sidewall of said body.

19. The actuator of claim 11 wherein said first ball race is formed on an insert positioned within and fixedly attached to said body.

20. The actuator of claim 19 wherein said insert is a collar with said first ball race formed on an interior wall, said collar being concentrically held within said body by a plurality of circumferentially spaced retainers longitudinally extending between said insert and said body.

21. The actuator of claim 19 wherein said first stop is a ring concentrically positioned within said body between an end of said insert toward said first end and said body, said ring being retained against axial movement within said body and having a circumferential interior edge portion projecting inwardly sufficient to block travel of said balls in said outer set of races toward said first end beyond said insert.

22. A fluid-powered ball screw actuator, comprising:
a body having a torque-transmitting first ball race, and first and second ends;

first stop means axially stationary with respect to said body for engaging and limiting travel of balls along said first ball race toward said first end;

a shaft disposed within said body and supported for rotation relative thereto, said shaft having a torque-transmitting second ball race;

second stop means axially stationary with respect to said shaft for engaging and limiting travel of balls along said second ball race toward said first end;

a piston reciprocally mounted within said body and having a head for application of fluid pressure to one or the other opposing sides of said head to produce axial movement of said piston toward said first or second end, said piston further having an elongated sleeve with a torque-transmitting third ball race corresponding to and confronting in substantially contiguous relationship said first ball race to form a laterally confined, variable-length first channel defined by the area of coincidence of said first and third ball races, and a torque-transmitting fourth ball race corresponding to and confronting in substantially contiguous relationship said second ball race to form a laterally confined, variable-length second channel defined by the area of coincidence of said second and third ball races, at least one of said first or second channels being helical, said third and fourth ball races extending over a sufficient axial length of said sleeve projecting beyond said first and second stop means, respectively, toward said first end as measured with said piston positioned at its end limit of travel toward said first end, to permit substantially unimpeded rolling travel of balls within said first and second channels toward said second end as said piston travels from an end limit of travel at said first end to an end limit of travel at said second end;

one or more first balls seated in said first channel to a side of said first stop means toward said second end for transmitting torque between said body and said piston upon axial movement of said piston by the application of fluid pressure to said head; and one or more second balls seated in said second channel to a side of said second stop means toward said second end for transmitting torque between said piston and said shaft upon axial movement of said piston by the application of fluid pressure to said head.

23. The actuator of claim 22 wherein said first and second ball races extend over a sufficient axial length of said body and shaft, respectively, to permit unimpeded rolling travel of said first and second balls within said first and second channels toward said second end as said piston travels from said end limit of travel at said first end to said end limit of travel at said second end.

24. The actuator of claim 22 wherein said third and fourth ball races extend beyond said first and second stop means, respectively, toward said first end, as measured with said piston positioned at said end limit of travel toward said first end, substantially one-half or more of the distance of the end-to-end axial travel of said piston within said body.

25. The actuator of claim 22, further including:
third stop means axially stationary with respect to said sleeve to a side of said first balls toward said second end for engaging and collecting balls in said first channel for regrouping toward said first stop means as said piston travels toward said first end; and fourth stop means axially stationary with respect to said sleeve to a side of said second balls toward said second end for engaging and collecting balls in said second channel for regrouping toward said second stop means as said piston travels toward said first end.

26. The actuator of claim 25 wherein said first and second ball races extend over an axial length of said body and shaft beyond said third and fourth stop means, respectively, toward said second end, as measured with said piston positioned at its end limit of travel toward said first end, substantially one-half or more of the distance of the end-to-end axial travel of said piston within said body.

27. The actuator of claim 22 wherein at least one of said helical first or second channel has a lead angle of at least four degrees.

28. The actuator of claim 22 wherein said first and second channels are helical.

29. The actuator of claim 22 wherein said first ball race is formed on an interior sidewall of said body.

30. The actuator of claim 22 wherein said first ball race is formed on an insert positioned within and fixedly attached to said body.

31. The actuator of claim 30 wherein said insert is a collar with said first ball race formed on an interior wall, said collar being concentrically held within said body by a plurality of circumferentially spaced retainers longitudinally extending between said insert and said body.

32. The actuator of claim 30 wherein said first stop means is a ring concentrically positioned within said body between an end of said insert toward said first end and said body, said ring being retained against axial movement within said body and having a circumferential interior edge portion projecting inwardly sufficient to block travel of said balls in said outer set of races toward said first end beyond said insert.

33. The actuator of claim 22 wherein said second stop means is a stop member fixedly attached to said shaft for rotary travel therewith.

34. The actuator of claim 33 wherein said stop member is a pin projecting sufficiently from said shaft to block travel of said second balls in said second ball race.

35. The actuator of claim 22 wherein said second stop means is a portion of said body substantially abutting an end of said second ball race toward said first end, said body portion being positioned to block travel of said second balls beyond said end of said second ball race.

36. A fluid-powered ball screw actuator, comprising:
a body having a torque-transmitting first ball race, and first and second ends;

a first stop axially stationary with respect to said body for engaging and limiting travel of balls along said first ball race toward said first end;

a rotatable member supported for rotation relative to said body, said member having a torque-transmitting second ball race;

a second stop axially stationary with respect to said member for engaging and limiting travel of balls along said second ball race toward said first end;

a piston reciprocally mounted within said body for application of fluid pressure to one or the other opposing sides thereof to produce axial movement of said piston toward said first or second end, said piston having an elongated sleeve with a torque-transmitting third ball race corresponding to and confronting said first ball race to form a first channel, and a torque-transmitting fourth ball race corresponding to and confronting said second ball race to form a second channel, at least one of said first or second channels being helical, said third and fourth ball races extending over an axial length of said sleeve projecting beyond said first and second stops, respectively, toward said first end to permit substantially unimpeded rolling travel of balls within said first and second channels as said piston reciprocates between its end limit positions within said body;

one or more first balls seated in said first channel to a side of said first stop toward said second end for transmitting torque between said body and said piston upon axial movement of said piston by the application of fluid pressure thereto; and one or more second balls seated in said second channel to a side of said second stop toward said second end for transmitting torque between said piston and said member upon axial movement of said piston by the application of fluid pressure thereto.

37. The actuator of claim 36 wherein said rotatable member is a shaft disposed within said body.

38. The actuator of claim 36 wherein said rotatable member is generally annular in shape with said second ball race formed on a sidewall thereof opposing said sleeve.

39. The actuator of claim 38 wherein said annular member has oppositely facing, radially extending end walls and said body has a wall portion confronting each of said end walls, said end walls and wall portions having corresponding circular grooves therein with ball bearings disposed therebetween for rotatably supporting said member relative to said body.

40. The actuator of claim 36 wherein said piston has a pair of opposing heads for the application of fluid pressure thereto, with said sleeve extending between said heads.

41. A fluid-powered actuator, comprising:
a body having first and second ends;
a shaft disposed within said body and supported for rotation relative thereto, said shaft having a torque-transmitting first ball race;
a first stop axially stationary with respect to said shaft for engaging and limiting travel of balls along said first ball race toward said first end;
a piston reciprocally mounted within said body and having a head for application a fluid pressure to one or the other opposing sides of said head to produce axial movement of said piston toward said first or second end, said piston further having an elongated sleeve with said shaft extending interior of said sleeve, said sleeve having a torque-transmitting second ball race corresponding to and confronting said first ball race to form a channel defined by the area of coincidence of said first and second ball races, said channel being helical, said second ball race extending over a sufficient axial length of said sleeve projecting beyond said first stop toward said first end, as measured with said piston positioned at its end limit of travel toward said first end, to permit substantially unimpeded rolling travel of balls within said channel toward said second end as said piston travels from an end limit of travel at said first end to an end limit of travel at said second end;

one or more balls seated in said channel to a side of said first stop toward said second end for transmitting torque between said piston and said shaft upon axial movement of said piston by the application of fluid pressure to said head; and means for transmission of torque between said piston and said body.

42. The actuator of claim 41 wherein said first ball race extends over a sufficient axial length of said shaft to permit unimpeded rolling travel of said balls within said channel toward said second end as said piston travels from said end limit of travel at said first end of said end limit of travel at said second end.

43. The actuator of claim 41, further including a second stop axially stationary with respect to said sleeve to a side of said balls toward said second end for engaging and collecting balls in said channel for regrouping toward said first stop as said piston travels toward said first end.

44. A fluid-powered actuator, comprising:
a body having first and second ends;
a shaft disposed within said body and supported for rotation relative thereto;
a torque-transmitting first ball race formed on one of said shaft or said body;
an axially stationary first stop positioned for engaging and limiting travel of balls along said first ball race toward said first end;
a piston reciprocally mounted within said body and having a head for application of fluid pressure to one or the other opposing sides of said head to produce axial movement of said piston toward said first or second end, said piston further having an elongated sleeve with said shaft extending interior of said sleeve;
a torque-transmitting second ball race formed on said sleeve corresponding to and confronting said first ball race to form a channel defined by the area of coincidence of said first and second ball races, said channel being helical, said second ball race extending over a sufficient axial length of said sleeve projecting beyond said first stop toward said second end as said piston travels from an end limit to travel at said first end to an end limit of travel at said second end;

one or more balls seated in said channel to a side of said first stop toward said second end for transmitting torque between said piston and said one of said shaft or said body upon axial movement of said piston by the application of fluid pressure to said head; and means for transmission of torque between said piston and the other of said shaft or said body.

45. The actuator of claim 44 wherein said first ball races extends over a sufficient axial length of said one of said shaft or said body to permit unimpeded rolling travel of said balls within said channel toward said second ends as said piston travels from said end limit of travel at said first end to said end limit of travel at said second end.

46. The actuator of claim 44, further including a second stop axially stationary with respect to said sleeve to a side of said balls toward said second end for engaging and collecting balls in said channel for regrouping toward said first stop as said piston travels toward said first end.

* * * * *